US 8,416,476 B2

(12) United States Patent
Tamehira et al.

(10) Patent No.: US 8,416,476 B2
(45) Date of Patent: Apr. 9, 2013

(54) IMAGE READER AND IMAGE FORMING APPARATUS

(75) Inventors: Masato Tamehira, Osaka (JP); Hiroshi Nakatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 289 days.

(21) Appl. No.: 13/008,981

(22) Filed: Jan. 19, 2011

(65) Prior Publication Data

US 2011/0176188 A1  Jul. 21, 2011

(30) Foreign Application Priority Data

Jan. 21, 2010  (JP) .................... 2010-010941

(51) Int. Cl.
*H04N 1/04* (2006.01)
(52) U.S. Cl. .......... 358/498; 358/474; 358/496; 399/24; 399/401; 271/110; 271/314
(58) Field of Classification Search .......... 358/498, 358/474, 496, 497, 486; 271/110, 10.11, 271/314, 118, 121, 117; 399/24, 401, 388, 399/405, 220
See application file for complete search history.

(56) References Cited

U.S. PATENT DOCUMENTS

| | | | | |
|---|---|---|---|---|
| 6,161,831 A * | 12/2000 | Kusakabe et al. | ............. | 271/186 |
| 6,209,861 B1 * | 4/2001 | Kakuta et al. | ................ | 271/3.02 |
| 6,640,082 B2 * | 10/2003 | Mitomi | ......................... | 399/374 |
| 6,744,541 B1 * | 6/2004 | Lu | .................................. | 358/497 |
| 6,795,160 B2 * | 9/2004 | Fukusaka | ......................... | 355/26 |
| 7,518,763 B2 * | 4/2009 | Shiraishi et al. | ............. | 358/475 |
| 7,612,923 B2 * | 11/2009 | Rusman et al. | ............... | 358/473 |
| 2004/0027620 A1 * | 2/2004 | Tseng | ............................ | 358/474 |

FOREIGN PATENT DOCUMENTS

| | | |
|---|---|---|
| JP | 06-189094 A | 7/1994 |
| JP | 2002-354201 A | 12/2002 |
| JP | 2004-336275 A | 11/2004 |

* cited by examiner

*Primary Examiner* — Negussie Worku
(74) *Attorney, Agent, or Firm* — Renner, Otto, Boisselle & Sklar, LLP

(57) ABSTRACT

A first reading guide includes a first guide member, which can turn around a first shaft and is so positioned as to face a first side of a document. The second reading guide includes a second guide member, which can turn around a second shaft and is so positioned as to face a second side of a document. The distance between a first reading position and a reference position is equal to that between a second reading position and the reference position. The first shaft is positioned on the side of the reference position where the first reading position is set. The second shaft is positioned on the side of the reference position where the second reading position is set.

13 Claims, 7 Drawing Sheets

(A)

(B)

(A)

(B)

(A)

(B)

IMAGE READER AND IMAGE FORMING APPARATUS

CROSS REFERENCE

This Nonprovisional application claims priority under 35 U.S.C. §119(a) on Patent Application No. 2010-010941 filed in Japan on Jan. 21, 2010, the entire contents of which are hereby incorporated by reference.

BACKGROUND OF THE INVENTION

The present invention relates to an image reader that can simultaneously read the images on both sides of a document. The invention also relates to an image forming apparatus fitted with such an image reader.

An image reader that can automatically read the images on both sides of a document passing along a document path includes a single reading unit fitted on the path. After the reading unit reads the image on one side of the document, the document is switched back and conveyed back along a portion of the document path so that the reading unit can read the image on the other side.

JP-2002-354201-A discloses an image reader including two reading units fitted on both sides of a document path. Each of the reading units reads the image on one side of a document passing along the document path. This reader can read the images on both sides of a document at a high speed, without the necessity of switching back the document.

When the reading units read the images on both sides of a card or another thick document, however, there is a possibility that the image on one side will be out of focus.

In general, when an image reader reads the image on a thick document passing along a document path, the reader shifts its guide member away from the path, widening the gap between its reading unit and the guide member in accordance with the thickness of the document. If this technique were applied to an image reader for simultaneously reading both sides of a document being conveyed, focal length stabilization might not be effected on one side of the document. This would create a strong possibility that this side of the document might be out of focus.

An object of the present invention is to provide an image reader that can simultaneously read the images on both sides of a document of any thickness, with the images in focus, while the document is conveyed. Another object of the invention is to provide an image forming apparatus fitted with such an image reader.

SUMMARY OF THE INVENTION

An image reader according to the present invention comprises a document path, a first reading unit, a second reading unit, a first reading guide, and a second reading guide.

The document path guides a document on a feed tray to a first delivery port.

The reading units are positioned on opposite sides of the document path. The first reading unit can read at a first reading position an image on a first side of a document being conveyed along the document path. The second reading unit reads at a second reading position an image on a second side of a document being conveyed along the document path. Each of the reading positions is either upstream or downstream from the other.

The reading guides so face each other across the document path as to guide a document while images on the document are read at the reading positions. The first reading guide includes a first guide member, which can turn around a first shaft extending across the document path, and which is so positioned as to face a first side of a document. The second reading guide includes a second guide member, which can turn around a second shaft extending across the document path, and which is so positioned as to face a second side of a document.

The distance between the first reading position and a reference position is equal to that between the second reading position and the reference position. The first shaft is positioned on the side of the reference position where the first reading position is set. The second shaft is positioned on the side of the reference position where the second reading position is set.

DETAILED DESCRIPTION OF THE INVENTION

Figure 1:
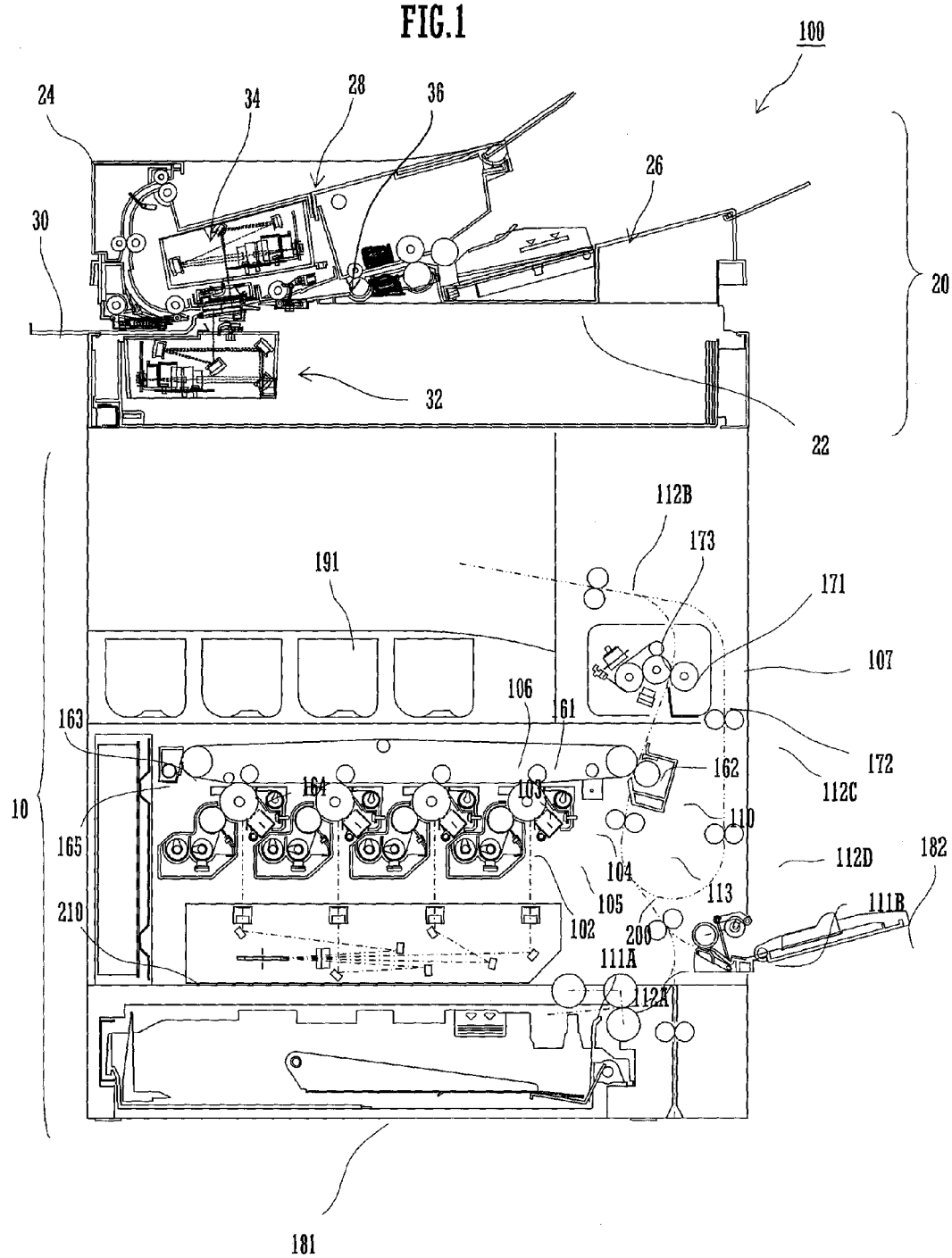
FIG. 1 is a drawing schematically showing the structure of an image forming apparatus embodying the present invention.

FIG. 1 schematically shows an image forming apparatus 100 according to an embodiment of the present invention. The apparatus 100 forms a multicolor or monochromatic image on a sheet of recording paper in accordance with the image data transmitted from the outside to the apparatus. The apparatus 100 includes a document reading section 20 and an image forming section 10.

The document reading section 20 can simultaneously read the images on both sides of a document passing in it. The reading section 20 has a document platform 22 of transparent glass, on which a document can be placed manually. The reading section 20 also has an automatic document reader 24, which is the image reader of the present invention. The reader 24 is fitted on the upper side of the platform 22. The reader 24 conveys the documents on a feed tray 26 sequentially along a document path 36 to either a first delivery port 28 for thin documents of ordinary paper or a second delivery port 30 for thick documents (cards, envelopes, etc.).

A first reading unit 32 and a second reading unit 34 are fitted respectively under and over the document path 36. The first reading unit 32 reads either the image on one side of a document passing along the path 36 or the image on the document on the document platform 22. The second reading unit 34 reads the image on the other side of the passing document. Each of the reading units 32 and 34 includes a reducing optical system including a CCD. Alternatively, each of the reading units 32 and 34 might include a CIS. The structure of the document reading section 20 will be described later on in detail.

The image forming section 10 is positioned under the document reading section 20 and has an optical scanner 210, four image stations, an intermediate transfer belt unit 106, a fixing unit 107, a feed cassette 181, and a delivery port 191. Each of the image stations includes a developing unit 102, a photoreceptor drum 103, a cleaner unit 104, and a charging unit 105.

The image forming apparatus 100 processes image data on a color image in black (K), cyan (C), magenta (M), and yellow (Y). The image stations respectively form black, cyan, magenta and yellow latent images.

The charging unit 105 charges the cylindrical surface of the photoreceptor drum 103 uniformly to a preset electric potential. The charging unit 105 is a charger as shown in FIG. 1 but might be a contact type charger such as a roller type or brush type charger.

The optical scanner 210 forms electrostatic latent images on the cylindrical surfaces of the photoreceptor drums 103 of the four image stations in accordance with the image data input to the scanner. The scanner 210 will be described later on in detail.

The developing unit 102 develops the electrostatic latent image on the associated drum 103 into a toner image with a toner of the associated color (Y, M, C, or K).

The cleaner unit 104 removes and recovers the toner remaining on the cylindrical surface of the associated drum 103 after the toner image on the drum is transferred.

The intermediate transfer belt unit 106 is fitted over the photoreceptor drums 103 and includes an intermediate transfer belt 161, a driving roller 162, a driven roller 163, four intermediate transfer rollers 164, and a cleaning unit 165. Each intermediate transfer roller 164 is provided for one of the image stations.

The driving roller 162 drives the intermediate transfer belt 161, which runs over the driving roller 162, driven roller 163 and intermediate transfer rollers 164. A transfer bias is applied to the intermediate transfer rollers 164 so as to transfer the toner images on the photoreceptor drums 103 to the intermediate transfer belt 161.

The outer side of the intermediate transfer belt 161 is in contact with the cylindrical surfaces of the photoreceptor drums 103. The intermediate transfer rollers 164 transfer the toner images of the four colors on the photoreceptor drums 103 sequentially one over another to the intermediate transfer belt 161, forming a multicolor toner image on the belt. The intermediate transfer belt 161 is endless and includes a film, which may have a thickness of 100-150 µm.

As stated already, a transfer bias is applied to the intermediate transfer rollers 164 so as to transfer the toner images. The transfer bias is a high voltage (having a polarity (+) reverse to the polarity (−) in which the toner is charged). Each intermediate transfer roller 164 includes a metal shaft, which is surrounded by an electrically conductive elastic material. The metal shaft may be made of stainless steel and have a diameter of 8-10 mm. The conductive elastic material may be EPDM or urethane foam and makes it possible to apply the high voltage uniformly to the intermediate transfer belt 161. The intermediate transfer rollers 164 are transfer electrodes, which might be brushes.

As stated already, the developing unit 102 develops the electrostatic image on the associated drum 103 into a toner image of the associated color. The toner images of the four colors are then superimposed into a multicolor toner image on the intermediate transfer belt 161.

A transfer roller 110 is supported close to the driving roller 162 and in compressive contact with the outer side of the intermediate transfer belt 161. As the intermediate transfer belt 161 runs, the transfer roller 110 transfers the multicolor toner image on the belt 161 to a sheet of recording paper passing through the nip between the belt 161 and roller 110.

In order to make the nip between the intermediate transfer belt 161 and transfer roller 110 constant, one of the transfer roller 110 and driving roller 162 is made of hard material such as metal, and the other is made of elastic or soft material such as elastic rubber or foamable resin.

A high voltage (having a polarity (+) reverse to the polarity (−) in which the toner is charged) is applied to the transfer roller 110 so as to transfer toner to a sheet of recording paper.

The cleaning unit 165 removes and recovers the toner having stuck to the intermediate transfer belt 161 while the belt was running in contact with the photoreceptor drums 103 and/or the toner remaining on the belt 161 if the transfer roller 110 has not transferred the toner image on the belt to a sheet of recording paper. Otherwise, the sticking toner and/or remaining toner might cause toner color mixture at the next step. The cleaning unit 165 is fitted close to the driven roller 163 and includes a cleaning blade or another cleaning member, which is in contact with the outer side of the intermediate transfer belt 161.

The feed cassette 181 is fitted under the optical scanner 210 and holds sheets of recording paper for image formation. The image forming section 10 is fitted with a hand-feed cassette 182, which can hold sheets of recording paper for image formation. The delivery port 191, which is a tray, is fitted in an upper portion of the image forming section 10 and holds printed sheets facedown.

The image forming section 10 has a substantially vertical paper path 200, along which a sheet of recording paper passes from the feed cassette 181 or hand-feed cassette 182 via the transfer roller 110 and fixing unit 107 to the delivery port 191. The path 200 leads from the cassettes 181 and 182 to the port 191. Pickup rollers 111A and 111B, pairs of conveying rollers 112A-112D, a pair of registering rollers 113, the transfer roller 110, the fixing unit 107, etc. are arranged on the path 200.

The conveying rollers 112A-112D are supported along the paper path 200. These rollers 112A-112D are small rollers for facilitating and assisting the conveyance of a sheet of recording paper.

The pickup roller 111A is supported near the front end of the feed cassette 181, picks up sheets of recording paper one after another from this cassette, and then feeds them to the paper path 200. Likewise, the pickup roller 111B is supported near the front end of the hand-feed cassette 182, picks up sheets of recording paper one after another from this cassette, and then feeds them to the paper path 200.

The registering rollers 113 temporarily hold a sheet of recording paper passing along the paper path 200. Then, the registering rollers 113 feed the sheet to the nip between the transfer roller 110 and intermediate transfer belt 161 at such a time that the leading end of the sheet is registered with the leading end of the toner image on the belt 161.

The fixing unit 107 includes a heating roller 171, a pressing roller 172, and an external heating belt 173. These rollers 171 and 172 rotate with a sheet of recording paper passing through the nip between them. A control unit (not shown) keeps the temperature of the heating roller 171 at a specified fixing temperature based on the signal from a temperature sensor (not shown). The heating roller 171 cooperates with the pressing roller 172 to bond the toner on the sheet thermo-compressively to it, melting, mixing and pressing the multi-color toner image transferred to the sheet. This fixes the toner image thermally on the sheet. The heating belt 173 heats the heating roller 171 from the outside of this roller.

The paper path 200 will be described below in detail.

As stated already, the image forming apparatus 100 is fitted with a feed cassette 181 and a hand-feed cassette 182, which hold sheets of recording paper in advance. Each of the pickup rollers 111A and 111B feeds sheets one after another from the associated cassette 181 or 182 to the paper path 200.

After a sheet of recording paper is fed from the cassette 181 or 182 in accordance with a one-side print request, the conveying rollers 112A convey the sheet along the paper path 200 to the nip between the registering rollers 113. The registering rollers 113 feed the sheet to the nip between the transfer roller 110 and intermediate transfer belt 161 at such a time that the leading end of the sheet is registered with the leading end of the image on the belt 161. The transfer roller 110 transfers the image to one side of the sheet. Subsequently, the sheet passes through the fixing unit 107, where the unfixed toner on the sheet melts and is fixed with heat. Then, the conveying rollers 112B, which are supported downstream from the fixing unit 107, deliver the sheet to the delivery port 191.

Likewise, in accordance with a double-side print request, the transfer roller 110 transfers an image to one side of a sheet of recording paper, which then passes through the fixing unit 107. When the trailing end of the sheet reaches the nip between the last conveying rollers 112B, these rollers start rotating reversely to direct the sheet to the conveying rollers 112C and 112D. Then, after the sheet passes again through the nip between the registering rollers 113, the transfer roller 110 transfers another image to the other side of the sheet. Finally, the last conveying rollers 112B deliver the sheet to the delivery port 191.

Figure 2:
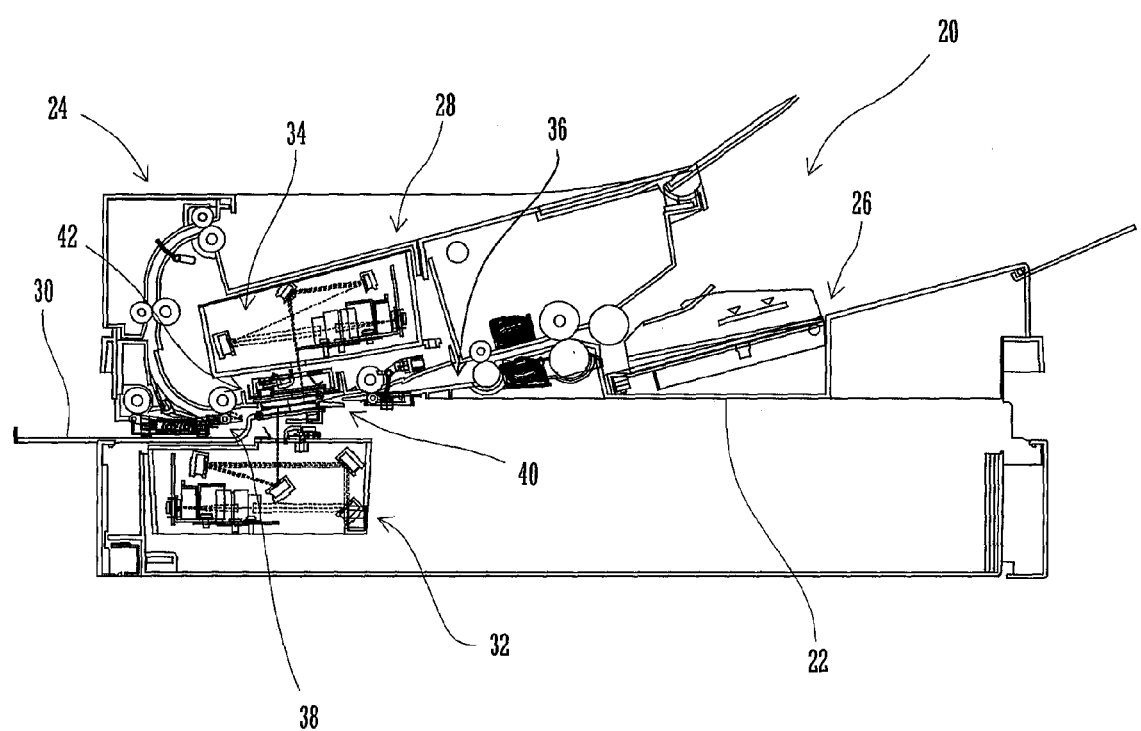
FIG. 2 is a drawing schematically showing the structure of the document reading section of the image forming apparatus.

With reference to FIG. 2, the structure of the document reading section 20 will be described below.

As shown in FIG. 2, the document path 36 slopes straight and downward from the feed tray 26 to a course switching member (leftward in FIG. 2). The switching member 38 is supported pivotably and guides to one of the delivery ports 28 and 30 a document passing along the path 36. The switching member 38 guides a card or another thick document, which may have a thickness of 0.6 or more mm, to the second delivery port 30. The switching member 38 guides a thinner document, which may have a thickness of less than 0.6 mm, via a curve in the path 36 to the first delivery port 28.

A first reading guide 40 and a second reading guide 42 are fitted upstream from the course switching member 38 on the document path 36 and positioned on the under and upper sides respectively of this path. The guides 40 and 42 are inclined substantially in parallel to the path 36. The guides 40 and 42 stabilize a document being read by the reading units 32 and 34.

Figure 3:
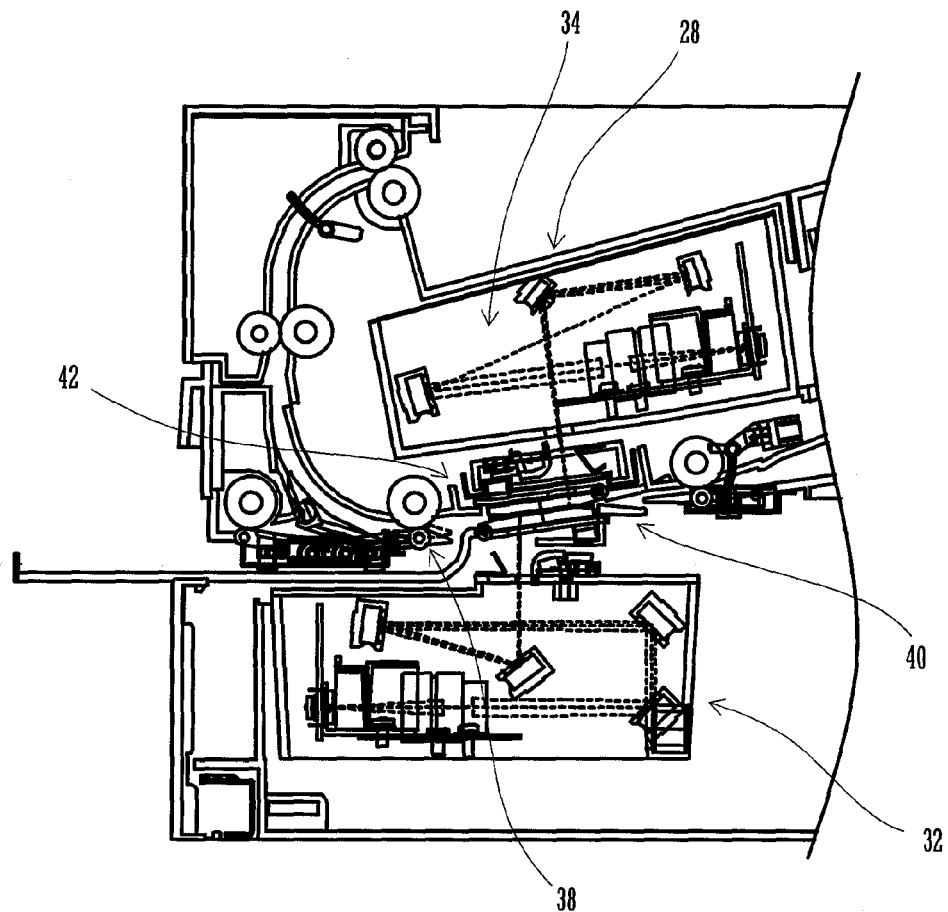
FIGS. 3A and 3B are drawings schematically showing the structure of the first and second reading guides of the document reading section and parts near the guides.
Figure 3:
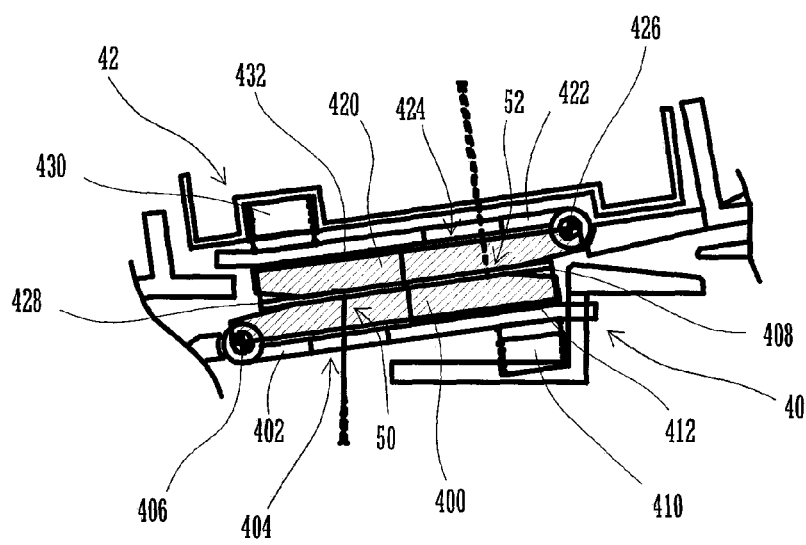

With reference to FIGS. 3A and 3B, the structure of the reading guides 40 and 42 and parts near them will be described below.

The reading guides 40 and 42 guide a document from which the reading units 32 and 34 read images in a first reading position 50 and a second reading position 52 respectively. The guides 40 and 42 face each other on both sides of the document path 36. The gap between the guides 40 and 42 can vary between about 0.6 and about 1.3 mm according to the thickness of a document passing through the gap. However, the guide gap might vary within another range.

The first reading guide 40 includes a holder 402 having a first shaft 406. The first shaft 406 extends horizontally across the document path 36 and is fitted to the downstream edge of the holder 402, which is near to the first reading position 50. The holder 402 is supported pivotably on the first shaft 406 and supports a first guide member 400, over which a document passes. The first guide member 400 takes the form of a plate, which may be made of glass or another transparent material.

Likewise, the second reading guide 42 includes a holder 422 having a second shaft 426. The second shaft 426 extends horizontally across the document path 36 and is fitted to the upstream edge of the holder 422, which is near to the second reading position 52. The holder 422 is supported pivotably on the second shaft 426 and supports a second guide member 420, under which a document passes. The second guide member 420 takes the form of a plate, which may be made of glass or another transparent material.

The reading guides 40 and 42 are fitted with compression springs 410 and 430 respectively, which bias the holders 402 and 422 respectively toward each other to narrow the gap between the guides 40 and 42.

Figure 4:
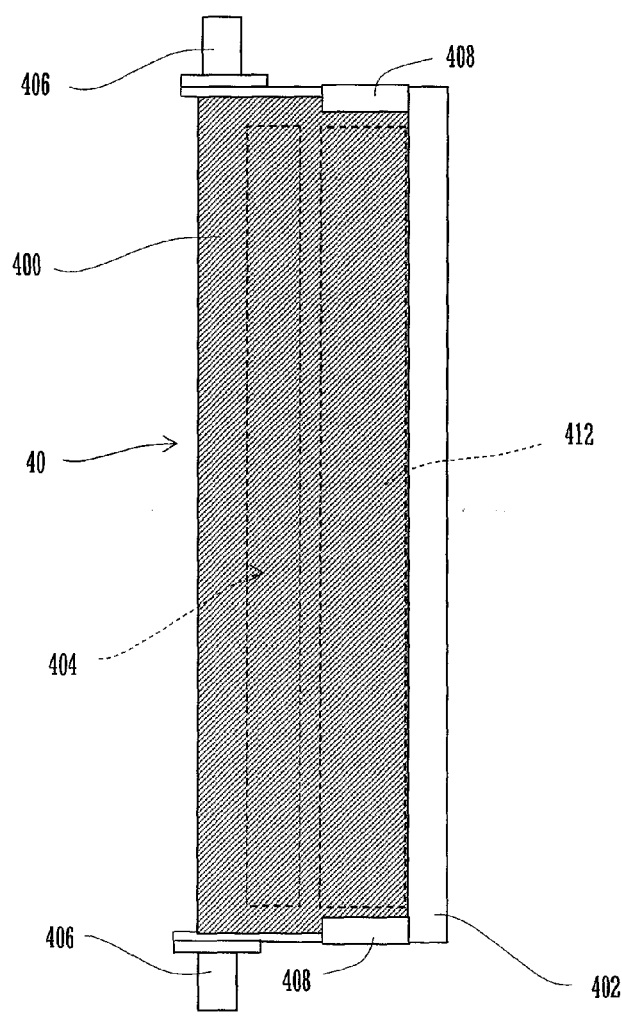
FIGS. 4A and 4B are drawings showing the structure of the first reading guide.
Figure 4:
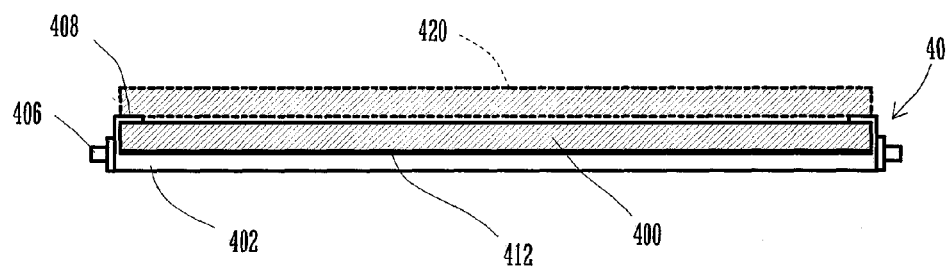

With reference to FIGS. 4A and 4B, the structure of the first reading guide 40 will be described below in more detail. Because the reading guides 40 and 42 are identical in basic structure, the description of the structure of the second reading guide 42 will be omitted.

As shown in FIGS. 4A and 4B, the holder 402 has a pair of grippers 408 formed at its ends near its upstream edge, which is away from the first reading position 50. The grippers 408 grip the ends of the first guide member 400 by holding its end faces and part of its document guide surface. The top parts of the grippers 408, which lie on the document guide surface of the guide member 400, function as spacers for defining the gap between the reading guides 40 and 42. The thickness of the top parts of the grippers 408 is the minimum gap (0.6 mm) between the guides 40 and 42 (actually between the guide members 400 and 420).

The holder 402 has an opening 404 in the form of a slot formed through it. The holder 402 also has a white reference sheet 412 for shading correction lying on its upper side. The sheet 412 lies outside and in parallel to the opening 404. Likewise as shown in FIG. 3B, the holder 422 of the second reading guide 42 has an opening 424 and a white reference sheet 432. The opening 404 and sheet 432 of the reading guides 40 and 42 respectively are positioned at the first reading position 50. The opening 424 and sheet 412 of the guides 42 and 40 respectively are positioned at the second reading position 52. The parts of the first reading guide 40 are identical to but might differ from those of the second reading guide 42.

Figure 5:
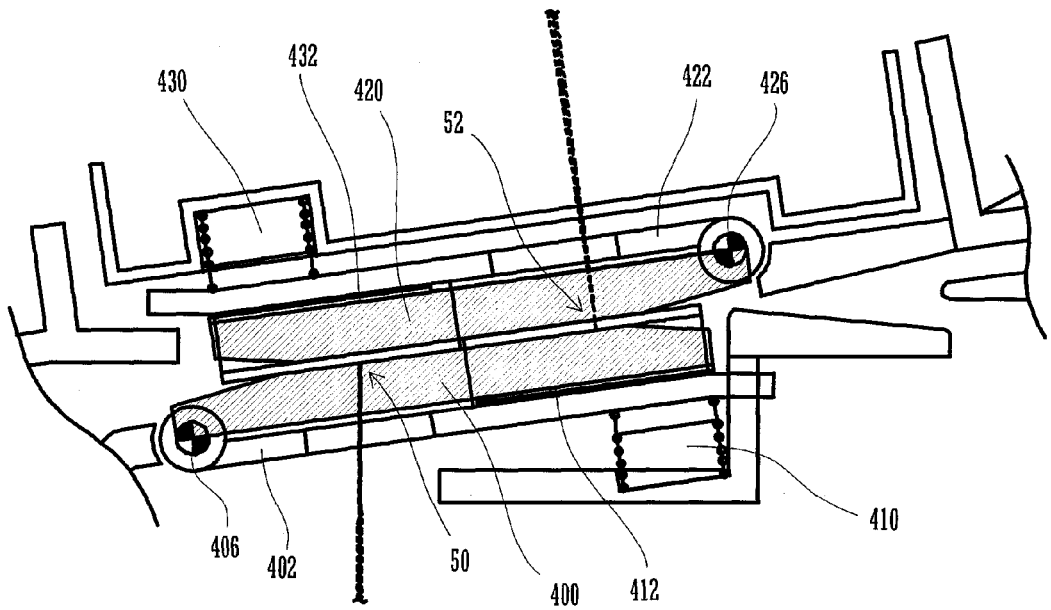
FIGS. 5A and 5B are drawings showing the operation of the reading guides.
Figure 5:
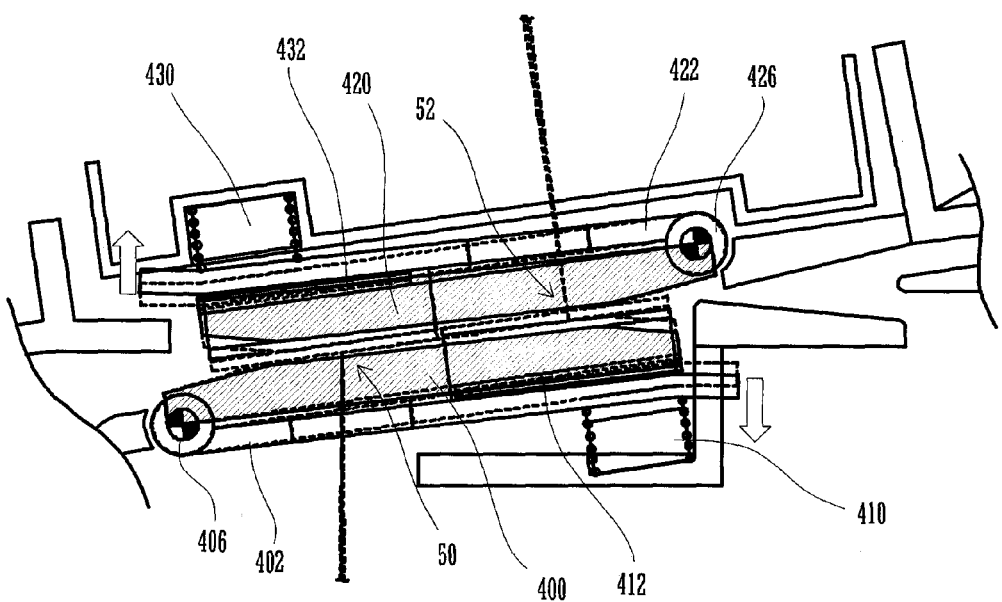

With reference to FIGS. 5A and 5B, the operation of the reading guides 40 and 42 will be described below. FIG. 5A shows the positions that the parts of the guides 40 and 42 assume when a document of ordinary paper having a thickness of about 0.1-0.2 mm passes through the gap between the guides. FIG. 5B shows the positions that the parts of the guides 40 and 42 assume when a card having a thickness of about 0.8 mm passes through the guide gap. FIG. 5B shows with broken lines the positions that the parts of the guides 40 and 42 assume while no card is passing through the guide gap. FIG. 5B also shows with solid lines the positions that the parts of the guides 40 and 42 assume while a card is passing through the guide gap.

As shown in FIG. 5A, the gap between the reading guides 40 and 42 is set normally at a small value of about 0.6 mm to effect focal length stabilization when the reading units 32 and read both sides of a document at the same time. When the guides 40 and 42 guide a document of ordinary paper having a thickness of about 0.1-0.2 mm, the small gap brings the images on both sides of the document into relatively clear focus.

When a document thicker than 0.6 mm passes through the gap between the reading guides 40 and 42, as shown in FIG. 5B, the document forces the guides 40 and 42 to pivot away from each other against the biasing force of the compression springs 410 and 430 respectively, widening the guide gap. Because the guide gap can widen up to about 1.3 mm, it is possible to read the images on both sides of a card while conveying the card well through the gap even if the card has a thickness of about 0.8 mm.

Figure 6:
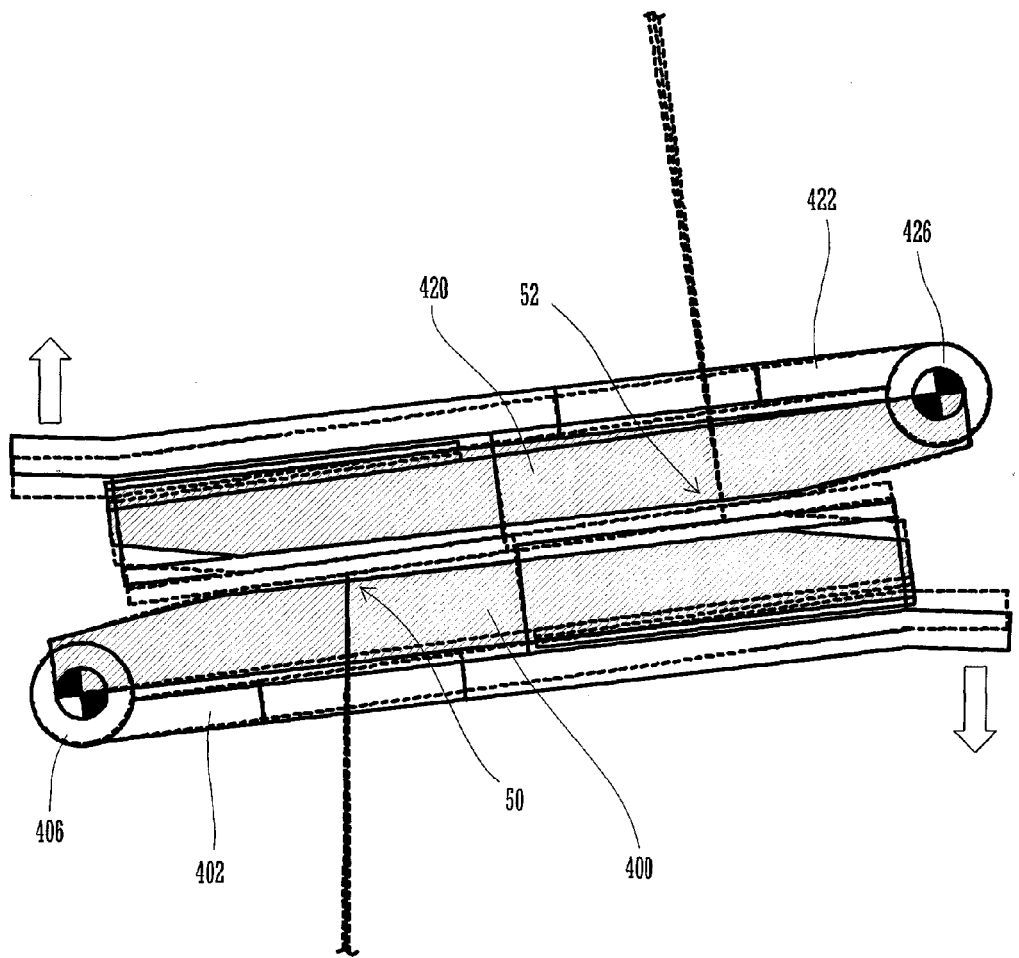
FIG. 6 is another drawing showing the operation of the reading guides.

As shown in FIG. 6, the shafts 406 and 426, on which the reading guides 40 and 42 respectively pivot, are positioned near the reading positions 50 and 52 respectively. Accordingly, even when a thick document displaces the guide members 400 and 420 from each other, the guide surfaces of the members 400 and 420 shift very little at the reading positions 50 and 52 respectively. This effects focal length stabilization even when the reading units 32 and 34 read the images on both sides of a thick document at the same time. The focal length stabilization brings the images into relatively clear focus, as is the case with a document of ordinary paper.

The upstream edge of the first guide member 400 and the downstream edge of the second guide member 420 can be displaced relatively greatly from the second and first guide members respectively. This makes it possible to widen the gap between the guide members 400 and 420 according to the thickness even of a thick document.

Thus, it is possible to secure focal length for documents of ordinary paper of ordinary thickness, and also secure focal length stably even when the reading units 32 and 34 read both sides of a card or another thick document. This enables the reading units 32 and 34 to read the images on both sides of a document of any thickness at the same time, with the images in focus.

The automatic document reader 24 delivers a card or another thick document to the second delivery port 30 only via the straight part of the document path 36 without conveying the document via the curve in the path. This makes thick documents less liable to be conveyed poorly.

Each of the reading units 32 and 34 is housed in a frame. There is no need to recess the frame for the first reading unit in order to form a document path along which a card or another thick document can pass straight. It would be difficult in design to recess the frame.

The shafts 406 and 426 are fitted at edges of the guide members 400 and 420 respectively but might be fitted at other positions not far from the reading positions 50 and 52 respectively.

Figure 7:
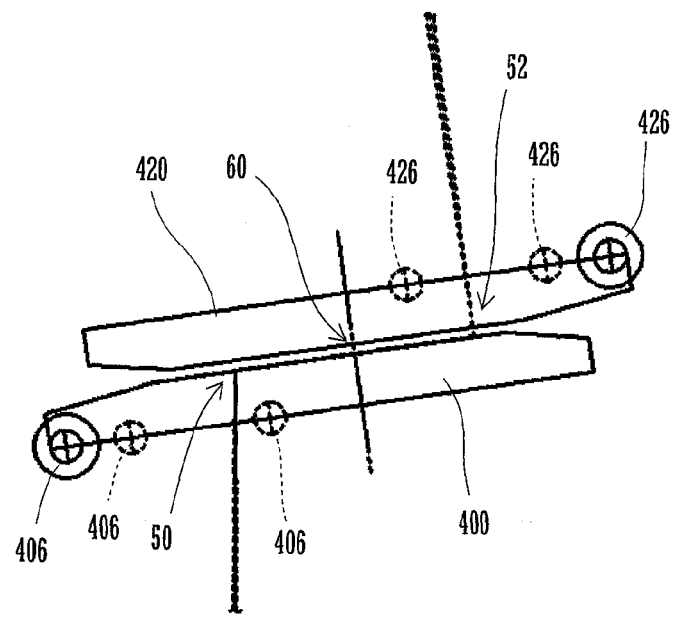
FIGS. 7A and 7B are drawings showing the positional relations among the first and second shafts of the reading guides and the first and second reading positions in the guides.
Figure 7:
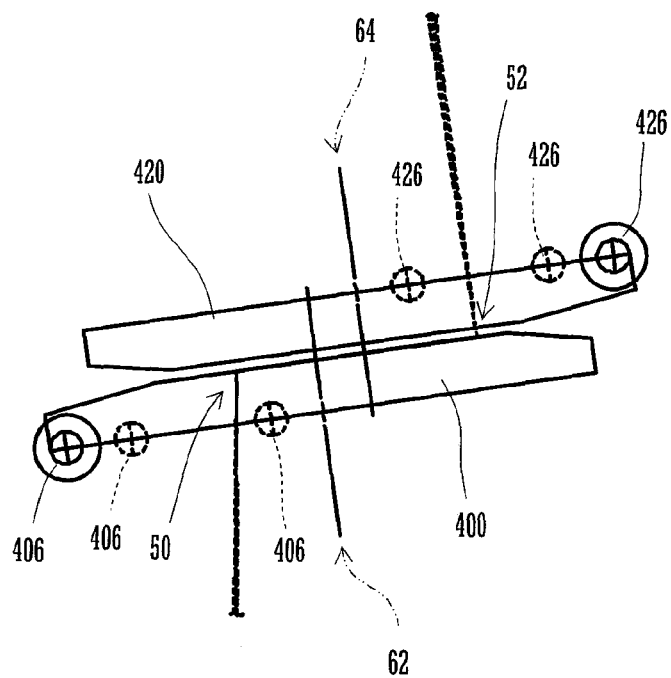

With reference to FIG. 7A, the distance between the first reading position 50 and a reference position 60 is equal to that between the second reading position 52 and the reference position 60. The first shaft 406 might be positioned on the side of the reference position 60 where the first reading position 50 is set. The second shaft 426 might be positioned on the other side of the reference position 60, where the second reading position 52 is set. This arrangement of the shafts 406 and 426 and reading positions 50 and 52 would effect focal length stabilization when the reading units 32 and 34 simultaneously read the images on both sides of a thick document. As a result, the images would be in relatively clear focus, as is the case with a document of ordinary paper.

With reference to FIG. 7B, center lines 62 and 64 extend through the midpoints of the guide members 400 and 420 respectively. The first shaft 406 and first reading position 50 might be downstream from the center line 62 of the first guide member 400. The second shaft 426 and second reading position 52 might be upstream from the center line 64 of the second guide member 420. This arrangement of the shafts 406 and 426 and reading positions 50 and 52 would likewise effect focal length stabilization when the reading units 32 and 34 simultaneously read the images on both sides of a thick document. As a result, the images would be in relatively clear focus, as is the case with a document of ordinary paper.

As stated already, a thick document forces the reading guides 40 and 42 to pivot. Alternatively, a user's settings on the operating panel of the image forming apparatus 100 could make the guides 40 and 42 pivot in advance. For example, by driving a stepping motor, a solenoid, etc. based on the settings of document type (size, thickness, etc.) entered by the user, it might be possible to make the guides 40 and 42 pivot.

This embodiment is an application of the present invention to the image forming apparatus 100, which includes the image forming section 10 and document reading section 20. The invention can, however, be applied to an image reader without an image forming section.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An image reader capable of reading images on both sides of a document being conveyed, the reader comprising:
   a document path for guiding a document on a feed tray to a first delivery port;
   a first reading unit positioned on one side of the document path;
   the first reading unit being capable of reading at a first reading position an image on a first side of a document being conveyed along the document path;
   a second reading unit positioned on the other side of the document path;
   the second reading unit being adapted to read at a second reading position an image on a second side of a document being conveyed along the document path, the second reading position being either upstream or downstream from the first reading position;
   a first reading guide and a second reading guide so facing each other across the document path as to guide a document while images on the document are read at the first and second reading positions;
   the first and second reading guides defining therebetween a gap variable according to the thickness of a document;
   the first reading guide including a first guide member turnable around a first shaft extending across the document path, the first guide member being so positioned as to face a first side of a document;
   the second reading guide including a second guide member turnable around a second shaft extending across the document path, the second guide member being so positioned as to face a second side of a document;
   wherein, when a reference position is defined so that the distance between the first reading position and the reference position is equal to the distance between the second reading position and the reference position, in the relation to the reference position, the first shaft is positioned on the side where the first reading position is set and the second shaft is positioned on the side where the second reading position is set.

2. An image reader as claimed in claim 1;
   the document path being adapted to guide a document to the first delivery port through a straight path and a curved path, the straight path sloping downward from the feed tray, the curved path being downstream from the straight path;

the first and second reading guides sloping along the straight path;

wherein a document having passed along the straight path can be delivered from the upstream end of the curved path in the document path to a second delivery port.

3. An image reader as claimed in claim 2;
the first reading guide further including a first holder supported turnably, the first holder holding the first guide member;
the second reading guide further including a second holder supported turnably, the second holder holding the second guide member;
wherein each of the holders includes a gap definer for defining the minimum value of the variable gap between the reading guides.

4. An image reader as claimed in claim 3;
the first holder having a first opening through which the first reading unit reads a document;
the first holder further having a first white reference member lying outside the first opening;
the second holder having a second opening through which the second reading unit reads a document;
the second holder further having a second white reference member lying outside the second opening;
wherein the first and second white reference members are shading correction members for the first and second reading units, which are positioned on both sides of the document path.

5. An image reader as claimed in claim 3;
the first shaft being positioned at a first edge of the first reading guide, the first edge being near to the first reading position;
the second shaft being positioned at a second edge of the second reading guide, the second edge being near to the second reading position.

6. An image reader as claimed in claim 4;
the first shaft being positioned at a first edge of the first reading guide, the first edge being near to the first reading position;
the second shaft being positioned at a second edge of the second reading guide, the second edge being near to the second reading position.

7. An image reader as claimed in claim 2;
the first shaft being positioned at a first edge of the first reading guide, the first edge being near to the first reading position;
the second shaft being positioned at a second edge of the second reading guide, the second edge being near to the second reading position.

8. An image reader as claimed in claim 1;
the first reading guide further including a first holder supported turnably, the first holder holding the first guide member;
the second reading guide further including a second holder supported turnably, the second holder holding the second guide member;
wherein each of the holders includes a gap definer for defining the minimum value of the variable gap between the to reading guides.

9. An image reader as claimed in claim 8;
the first holder having a first opening through which the first reading unit reads a document;
the first holder further having a first white reference member lying outside the first opening;
the second holder having a second opening through which the second reading unit reads a document;
the second holder further having a second white reference member lying outside the second opening;
wherein the first and second white reference members are shading correction members for the first and second reading units, which are positioned on both sides of the document path.

10. An image reader as claimed in claim 9;
the first shaft being positioned at a first edge of the first reading guide, the first edge being near to the first reading position;
the second shaft being positioned at a second edge of the second reading guide, the second edge being near to the second reading position.

11. An image reader as claimed in claim 8;
the first shaft being positioned at a first edge of the first reading guide, the first edge being near to the first reading position;
the second shaft being positioned at a second edge of the second reading guide, the second edge being near to the second reading position.

12. An image reader as claimed in claim 1;
the first shaft being positioned at a first edge of the first reading guide, the first edge being near to the first reading position;
the second shaft being positioned at a second edge of the second reading guide, the second edge being near to the second reading position.

13. Am image forming apparatus comprising an image reader as claimed in claim 1.

* * * * *